United States Patent
de Jong et al.

(10) Patent No.: US 11,561,342 B1
(45) Date of Patent: Jan. 24, 2023

(54) ELECTRONIC DEVICES WITH OPTICAL AND RADIO-FREQUENCY COMPONENTS

(71) Applicant: Apple Inc., Cupertino, CA (US)

(72) Inventors: Erik G. de Jong, San Francisco, CA (US); Michael B. Wittenberg, San Francisco, CA (US); Sameer Pandya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 16/985,125

(22) Filed: Aug. 4, 2020

Related U.S. Application Data

(60) Provisional application No. 62/905,640, filed on Sep. 25, 2019.

(51) Int. Cl.
| | |
|---|---|
| *G02B 6/06* | (2006.01) |
| *G02B 23/26* | (2006.01) |
| *G06F 21/32* | (2013.01) |
| *G02B 23/24* | (2006.01) |
| *G06V 40/12* | (2022.01) |
| *G02B 6/12* | (2006.01) |

(52) U.S. Cl.
CPC ......... *G02B 6/065* (2013.01); *G02B 23/2469* (2013.01); *G02B 23/26* (2013.01); *G06F 21/32* (2013.01); *G06V 40/1365* (2022.01); *G02B 2006/12138* (2013.01)

(58) Field of Classification Search
CPC .......... G02B 6/08; G02B 6/065; G02B 23/26; G02B 23/2469; G02B 2006/12138; G06F 21/32; G06V 40/1365
See application file for complete search history.

(56) References Cited

U.S. PATENT DOCUMENTS

| | | | |
|---|---|---|---|
| 7,145,611 | B2 | 12/2006 | Dubin et al. |
| 7,910,207 | B2 | 3/2011 | Kamiyama et al. |
| 9,274,369 | B1* | 3/2016 | Lee ..................... G02B 6/0005 |
| 10,223,952 | B2* | 3/2019 | Powell ............. G02F 1/133526 |
| 10,579,157 | B1* | 3/2020 | Wilson .................. G06F 3/0216 |
| 10,620,365 | B2 | 4/2020 | Dawson |
| 11,231,814 | B1* | 1/2022 | Wittenberg ............. G02B 6/06 |
| 11,247,421 | B1* | 2/2022 | Gulgunje ......... B29D 11/00663 |
| 11,309,370 | B1* | 4/2022 | Brown ................ H01L 27/3244 |
| 2005/0243415 | A1 | 11/2005 | Lowe et al. |
| 2011/0025594 | A1 | 2/2011 | Watanabe |
| 2014/0218961 | A1 | 8/2014 | Wu |

(Continued)

*Primary Examiner* — Thomas A Hollweg
*Assistant Examiner* — Mary A El-Shammaa
(74) *Attorney, Agent, or Firm* — Treyz Law Group, P.C.; G Victor Treyz; Tianyi He

(57) ABSTRACT

An electronic device may have a display overlapped by an image transport layer such as a coherent fiber bundle or layer of Anderson localization material. The image transport layer may have an input surface that receives an image from the display and a corresponding output surface to which the image is transported. The input surface and output surface may have different shapes. During fabrication of the image transport layer, a peripheral portion of the image transport layer may be laterally indented to form a peripheral recess. Electrical components such as optical and radio-frequency components may be mounted in the recess and may be overlapped by peripheral portions of the image transport layer and/or may be mounted under the display.

12 Claims, 8 Drawing Sheets

(56) References Cited

U.S. PATENT DOCUMENTS

| | | |
|---|---|---|
| 2015/0092395 A1 | 4/2015 | Wu |
| 2017/0094815 A1 | 3/2017 | Chin et al. |
| 2018/0128973 A1 | 5/2018 | Powell et al. |
| 2019/0391326 A1* | 12/2019 | Yang ........................ G02B 6/08 |
| 2021/0063816 A1* | 3/2021 | He .......................... G06V 10/17 |
| 2022/0309980 A1* | 9/2022 | Wang ....................... G09G 3/20 |

* cited by examiner

ELECTRONIC DEVICES WITH OPTICAL AND RADIO-FREQUENCY COMPONENTS

This application claims the benefit of provisional patent application No. 62/905,640, filed Sep. 25, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. The shape and other characteristics of many displays can pose challenges during integration of displays and other components into an electronic device, particularly in situations where space is limited.

SUMMARY

An electronic device may have a display overlapped by an image transport layer such as a coherent fiber bundle or layer of Anderson localization material. The image transport layer may have an input surface that receives an image from the display and a corresponding output surface to which the image is transported. The input surface and output surface may have different shapes.

During fabrication of the image transport layer, a peripheral portion of the image transport layer may be laterally indented to form a peripheral recess. Electrical components such as optical and radio-frequency components may be mounted in the recess. During operation, light or radio-frequency signals may pass through the image transport layer. Light may, for example, be conveyed through binder in the image transport layer or other non-guiding light path.

If desired, an electrical component such as an optical component may be mounted in a location where the optical component is overlapped by the display and the input surface. In this type of arrangement, the optical component may receive light that passes along a non-guiding light path through the image transport layer and through the display. Arrangements in which received light passes through the display after passing through a fiber core or other light guide path may also be used.

Optical components for the electronic device may include light-emitting devices and light-sensing devices. Optical components that emit and/or detect light may be overlapped by peripheral portions of the image transport layer and/or may be mounted under the display.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an image transport layer. The image transport layer may have an input surface that receives an image from the array of pixels and a corresponding output surface to which the image is transported from the input surface. A user viewing the image transport layer will view the image from the array of pixels as being located on the output surface.

In configurations in which the input and output surfaces have different shapes, the image transport layer may be used to warp the image produced by the array of pixels. For example, the shape of the image can transformed and the effective size of the image can be changed as the image passes through the image transport layer. In some configurations, edge portions of the image are stretched outwardly to help minimize display borders.

Image transport layers can be formed from coherent fiber bundles (sometimes referred to as fiber optic plates) and/or Anderson localization material. Glass and/or polymer may be used in forming image transport layer structures. To help protect the output surface of an image transport layer, an optional transparent protective layer may be included on the outer surface of the display cover layer. This transparent protective layer may be, for example, a glass plate, or a protective layer formed from other transparent material such as clear polymer or sapphire or other crystalline materials. In some arrangements, image transport layers and/or protective layers can be formed over components other than displays.

It can be challenging to incorporate electrical components into an electronic device. For example, in devices with narrow borders, display structures are often located close to the periphery of device housings. As a result, the amount of space available for conveying light to an optical sensor or the amount of space available to emit and/or receive radio-frequency signals may be constrained. To accommodate such components, the components can be overlapped by portions of the image transport layer such as portions of the image transport layer near the periphery of the display or other portions.

Figure 1:
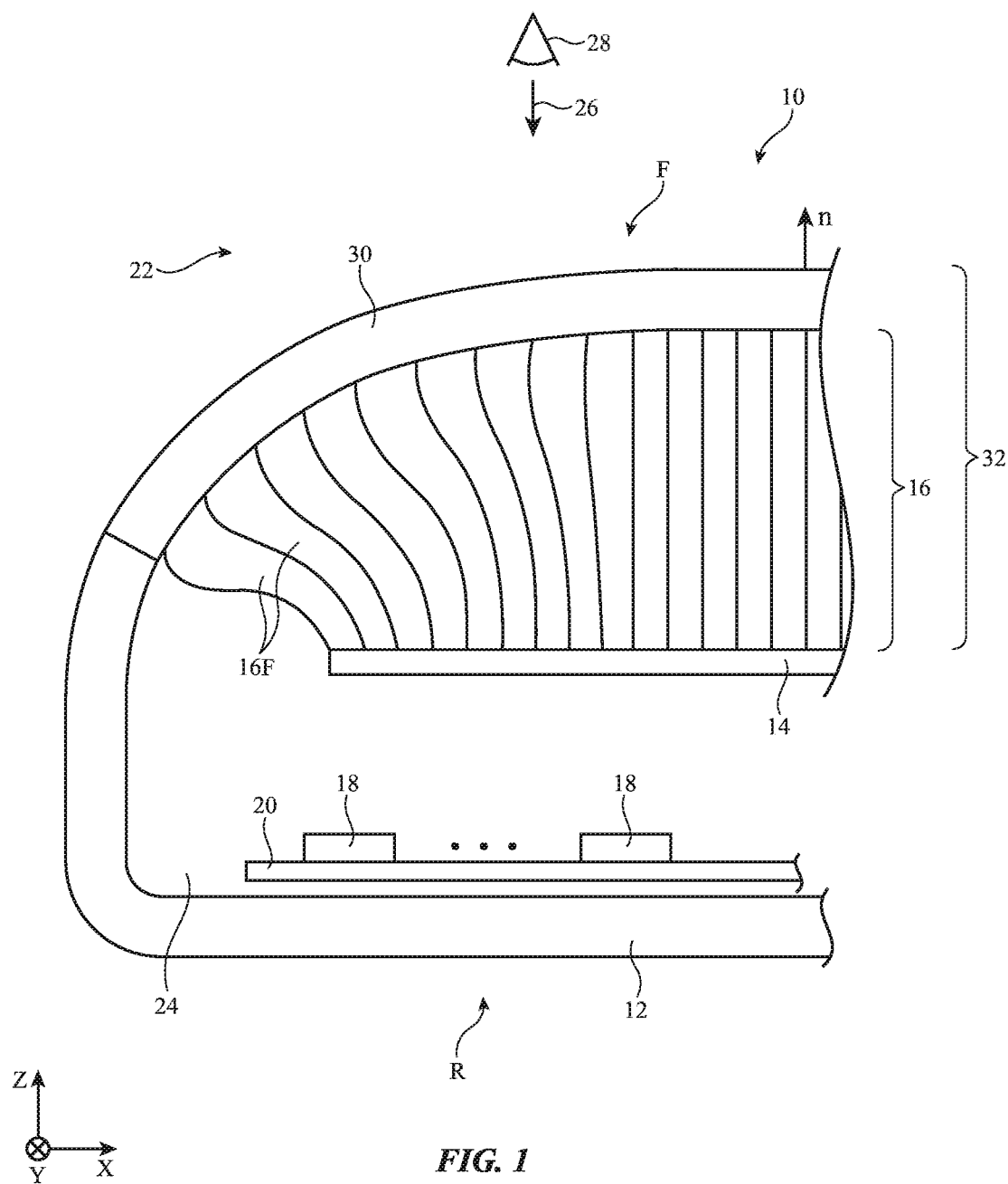
FIG. 1 is a side view of an illustrative electronic device with an image transport layer in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
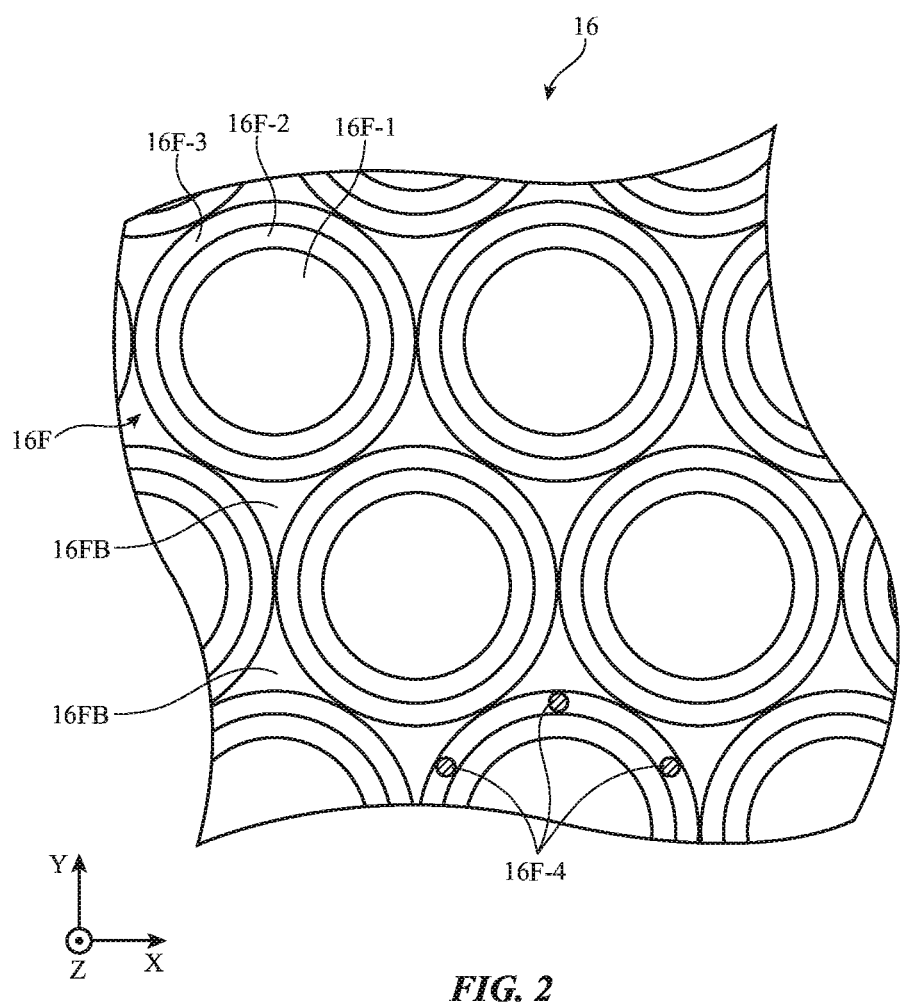
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material or lower than the refractive index of the cladding material to promote total internal reflection (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

If desired, image transport layer 16 may be formed from Anderson localization material in addition to or instead of fibers 16F. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Figure 3:
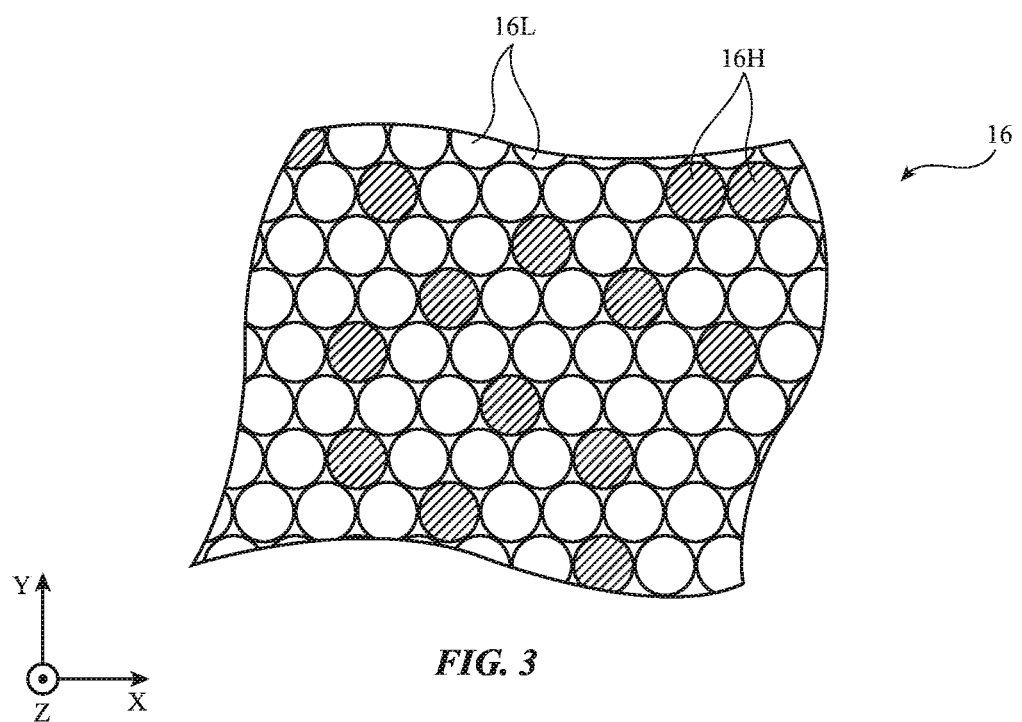
FIG. 3 is a cross-sectional view of a portion of an illustrative image transport layer formed using Anderson localization material in accordance with an embodiment.

FIG. 3 is a cross-sectional view of a portion of an image transport layer formed from Anderson localization material. In the example of FIG. 3, image transport layer 16 includes a random (pseudorandom) set of elongated optical structures of different refractive index values. These structures may, for example, be optical filaments that run into and out of the page of FIG. 3 and that have different refractive index values such as first filaments 16H with higher refractive index values and second filaments 16L with lower refractive index values. The refractive indices of filaments 16L and 16H may differ by any suitable amount (e.g., by at least 0.05, at least 0.1, at least 0.2, at least 0.3, by less than 0.8, etc.). The filaments may be distributed laterally (in dimensions X and Y) with a random pattern and may have any suitable cross-sectional shape (circular, rectangular, etc.). Anderson localization material preforms can be formed by drawing and assembling individual filaments of different refractive index values into bundles and/or can be formed by extruding lengths of material that include laterally interspersed areas of different respective refractive index values. Preforms can then be formed into layer 16 using one or more fusing and drawing operations. Other fabrication techniques may be used, if desired. To absorb stray light within an image transport layer formed from Anderson localization material, the Anderson localization material may include light absorbing material (e.g., light-absorbing filaments interspersed with transparent filaments or other light-absorbing structures).

Figure 4:
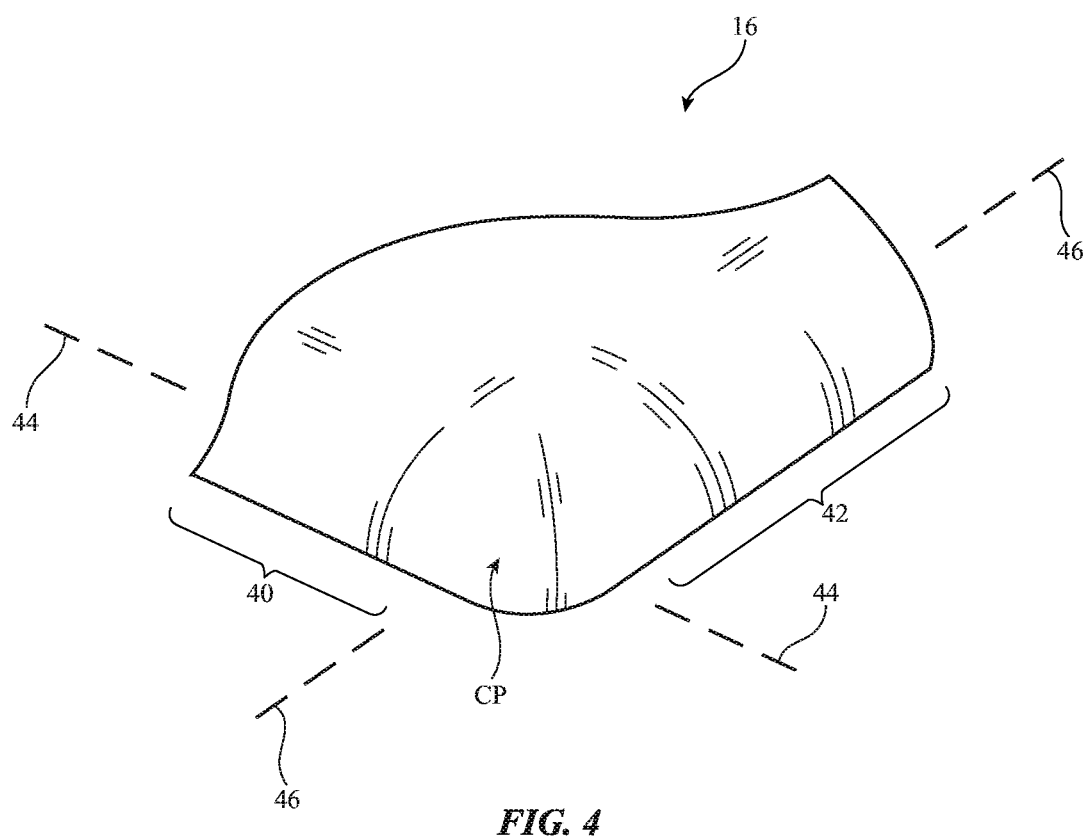
FIG. 4 is a perspective view of a portion of an image transport layer surface with compound curvature in accordance with an embodiment.

Image transport layers can be used to transport an image from a first surface (e.g., the surface of a pixel array) to a second surface (e.g., a surface in device 10 with compound curvature or other curved and/or planar surface shape) while preserving the integrity of the image. A perspective view of an illustrative corner portion of image transport layer 16 is shown in FIG. 4. In the example of FIG. 4, device 10 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 4, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces). When overlapped by protective layer 30, the overlapping portions of protective layer 30 may have corresponding surfaces with compound curvature. When selecting the size and shape of the output surface of layer 16 and therefore the size and shape of the image presented on the output surface, the use of an image transport layer material with compound curvature can provide design flexibility.

Figure 5:
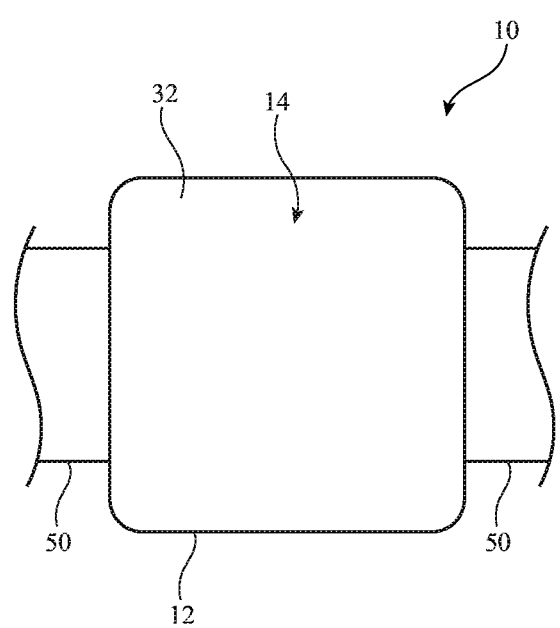
FIG. 5 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 5. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

Image transport layers may be formed by molding or otherwise processing blocks of image transport layer material (e.g., blocks of coherent fiber bundle material or Anderson localization material). These processing operations may include, for example, molding a block of image transport layer material in a heated mold to help create a lateral indentation in a block of image transport layer material (e.g., to create a peripheral undercut region with outwardly bent and stretched fibers as shown by the recess on the left side of layer 16 of the example of FIG. 1). The molding operation may help define light guiding optical paths through the image transport layer material that can hide inactive border structures (as an example). Additional processing (sawing, grinding, polishing, etc.) may be used to form a final desired shape for the transport layer (e.g., a shape having a peripheral portion with a downwardly curved cross-sectional profile of the type shown in FIG. 1 other suitable shape).

Figure 6:
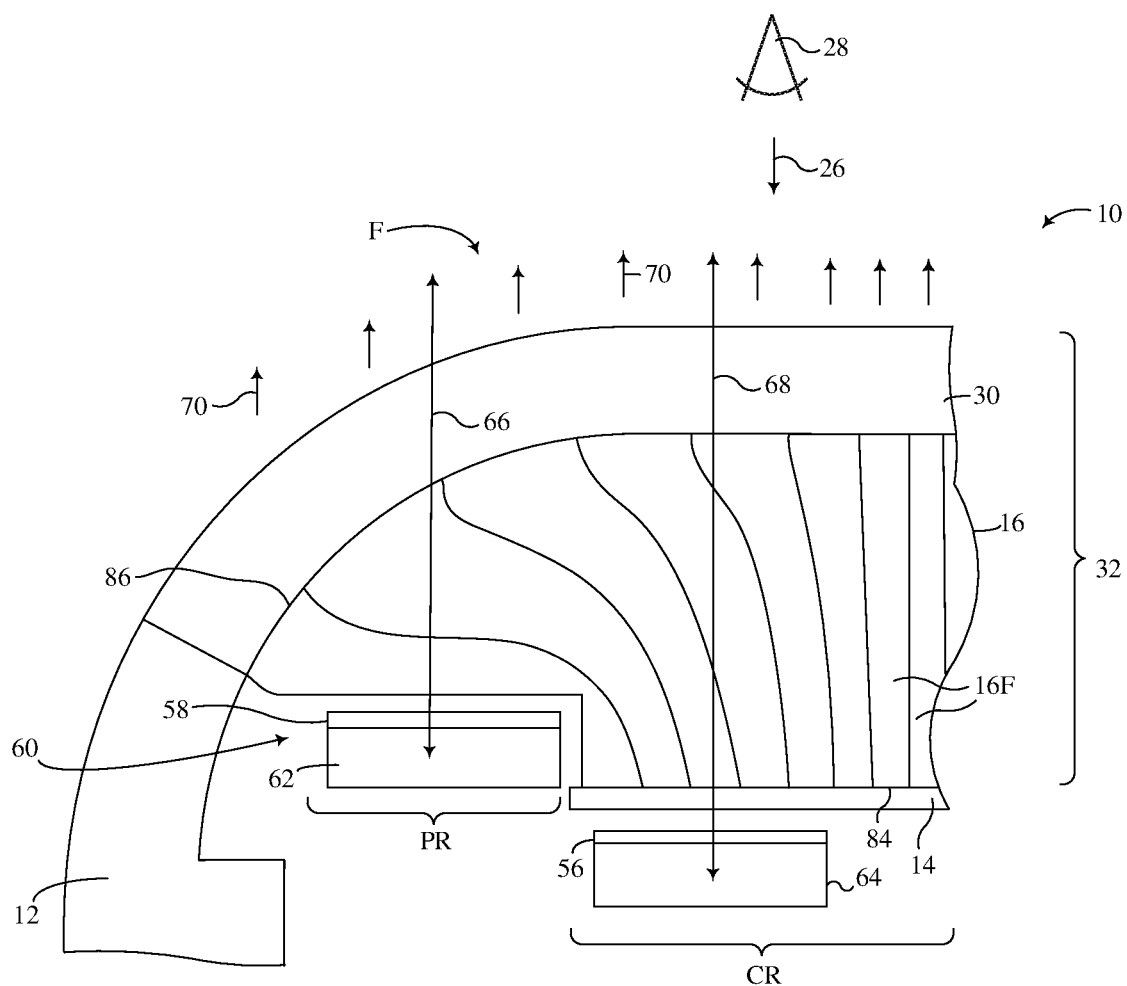
FIG. 6 is a cross-sectional side view of an illustrative electronic device with optical components such as light sensors that are overlapped by an image transport layer in accordance with an embodiment.

FIG. 6 is a cross-sectional side view of device 10 in an illustrative configuration in which electrical components such as optical components 62 and 64 are overlapped by portions of image transport layer 16. Display 14 may present an image to input surface 84 of layer 16 in central region CR that is transported to corresponding output surface 86. Peripheral portions of image transport layer 16 (e.g., the portion of layer 16 in peripheral region PR) may be deformed (e.g., during processing operations such as molding, grinding, etc.). In the example of FIG. 6, illustrative optical component 62 is overlapped by peripheral region PR of layer 16 and lies within a peripheral recess such as recess 60 that is formed at the periphery of image transport layer 16 during molding operations and other processing operations. The absence of image transport layer material in recess 60 provides space to accommodate optical component 62. Optical component 64 is located under a peripheral portion of display 14 (e.g., near the edge of central region CR) and is therefore also overlapped by input surface 84 of image transport layer 16.

One or more optical components 62 and/or 64 may be used in device 10. Optical components 62 and/or 64 may emit and/or may detect light. For example, components 62 and/or 64 may emit visible light, infrared light, and/or ultraviolet light. Components 62 and/or 64 may also detect visible light, infrared light, and/or ultraviolet light. Components 62 and/or 64 may be configured to both emit and sense light or may be configured to only emit or only sense light. Light sensing circuitry may be based on photodetectors such as photodiodes.

Optical filters such as optical filter 58 and optical filter 56 may overlap components 62 and 64, respectively. These optical filters may filter emitted light and/or may filter incoming light and may serve as bandpass filters, bandstop filers, short wavelength cut filters and/or long wavelength cut filters. For example, optical filters 58 and/or 56 may be visible-light-blocking-and-infrared-light-transmitting filters configured to block visible light while passing infrared light, may be infrared-light-blocking-and-visible-light transmitting filters, may be configured to pass particular visible light colors while blocking other wavelengths of light (e.g., to serve as red filters that pass red light, green filters that pass green light, blue filters that pass blue light, and/or filters of other colors), may serve as ultraviolet-light bandpass filters or ultraviolet-light-blocking filters, and/or may otherwise filter incoming and/or outgoing light. Filters for components 62 and 64 may be formed from thin-film interference filter structures (e.g., stacks of thin-film dielectric layers such as alternating higher and lower refractive index layers), may be formed from polymer or glass containing dye and/or pigments, and/or may be formed from other light filtering structures.

Components 62 and/or 64 may include light-emitting components (e.g., light sources such as light-emitting diodes and/or lasers) and/or may include light-sensing components (e.g., light detectors such as photodiodes). Examples of optical components that may be used for components 62 and/or 64 include ambient light sensors, proximity sensors, optical touch sensors, optical biometric sensors, status indicator lights, and/or other components that emit and/or detect light.

Ambient light sensors may be monochromatic or may be color sensitive. Monochromatic ambient light sensors measure the intensity of ambient light. Color ambient light sensors have multiple color channels for measuring ambient light intensity and for measuring ambient light color. Color ambient light data may be gathered as color coordinates, as color temperature measurements, as correlated color temperature measurements, as spectral data, and/or as other color information.

Proximity sensors may emit light (e.g., infrared light) and detect this emitted light after the emitted light has reflected from a user's body part or other external object. The intensity of the reflected light may be used to determine whether an external object is in the vicinity of the proximity sensor.

An optical touch sensor may also include a light emitter (e.g., an infrared light source) and light detector (e.g., an infrared light sensor) and may be configured to detect when a user's fingers or other body part touches the surface of device 10 overlapping the optical touch sensor. An optical touch sensor may have an array of emitters and detectors (e.g., to implement a one-dimensional touch sensor that extends along a particular dimension such as along an edge of device 10 and/or to implement a two-dimensional touch sensor).

An optical biometric sensor such as an optical fingerprint sensor may have an array of closely spaced light detectors (and optionally one or more light sources) for measuring a user's fingerprints. An optical biometric sensor such as health sensor may emit and detect green light or light of one or more other colors to detect a user's heart rate, a user's blood oxygen level, and/or other health information.

A status indicator light may have one or more light-emitting components (e.g., diodes and/or lasers of one or more colors). Light-emitting components such as these may emit pulsed and/or steady light and may be used to indicate device operating status (e.g., power on/off status, battery charging status, battery level, wireless signal strength level, airplane mode status, ring/silent mode status, etc.). Light-emitting components may also serve as camera flash components, as flashlights, etc.

During normal operation in which an image is displayed on display 14, image light is guided along light-guiding optical paths such as the bent optical paths formed from fibers 16F in a coherent fiber bundle or along bent optical paths in Anderson localization material. In this way, an image presented at the input surface of layer 16 is transported to the output surface of layer 16. This guided image light (image light 70 of FIG. 6) is then viewable through layer 30 by viewer 28.

In contrast, light associated with optical components 62 and/or 64 need not be guided along the fibers or other optical paths, as shown by illustrative emitted and/or received non-guided light 66 and non-guided light 68. In a coherent fiber bundle, for example, there are non-guiding light paths between fiber cores 16F-1 (e.g., transverse light pathways that pass through binder 16FB). Similarly, light may pass along non-guiding light paths through Anderson localization material transverse to the Anderson localization filaments that are guiding light. The presence of these non-guiding transverse optical paths allows ambient light or other light to be received through image transport layer 16 in peripheral region PR or central region CR without being guided along the lengths of fiber cores 16F-1 or the light guiding optical paths in Anderson localization material, as shown by non-guiding light paths 66 an 68 of FIG. 6. Light emitted from components 62 and/or 64 may also pass through layer 16 along non-guiding light paths.

If desired, dopant or other material may be incorporated into the binder or other structures in layer 16 (e.g., in the portion of layer 16 in peripheral region PR and/or in central region CR). Optical component 62 may be, as an example, an ultraviolet light sensor that measures exposure of device 10 and the user of device 10 to ultraviolet light. Ultraviolet light may pass to optical component 62 along non-guiding path 66 through image transport layer 16 in peripheral region PR. Component 62 may contain a semiconductor photodetector or other component configured to detect ultraviolet light directly. If desired, dopant in the binder or other structures of layer 16 (e.g., in region PR) may be used to create visible light in response to received ultraviolet light along path 66. The dopant may include, for example, substances such as particles, dye, and/or other material that exhibits photoluminescence (fluorescence, phosphorescence, etc.) such as visible-light photoluminescence when exposed to light (e.g., ultraviolet light). In this type of arrangement, ultraviolet light may be detected by detecting the visible light produced by the dopant when exposed to ultraviolet light. If it is desired to measure ultraviolet light intensity separate from visible light intensity, visible-light-blocking material (and, if desired, infrared-light-blocking material) may be incorporated above the photoluminescent material in layer 16 to ensure that visible light photoluminescence is only produced or is primarily produced in response to exposure to ultraviolet ambient light.

In the example of FIG. 6, path 66 does not pass through display 14. As a result, the structures of display 14 are not present to attenuate light traveling (inwardly or outwardly) along path 66. Path 68 passes through display 14, so the structures of display 14 (e.g., light-blocking structures such as metal traces, anode structures, and/or other thin-film structures in an organic light-emitting diode display, etc.) may attenuate light passing along path 68. Nevertheless, the level of attenuation due to display 14 may be less than 100% due to the presence of relatively transparent openings within the circuitry of display 14 and this level of attenuation may be acceptable for the operation of component 64. As an example, component 64 may be configured to measure ambient light. The presence of display 14 may attenuate the amount of ambient light received along path 68 by at least 20%, by at least 50% or by at least 90%, but less than 100%. This may allow sufficient ambient light to be received by component 64 to make satisfactory ambient light measurements.

Figure 7:
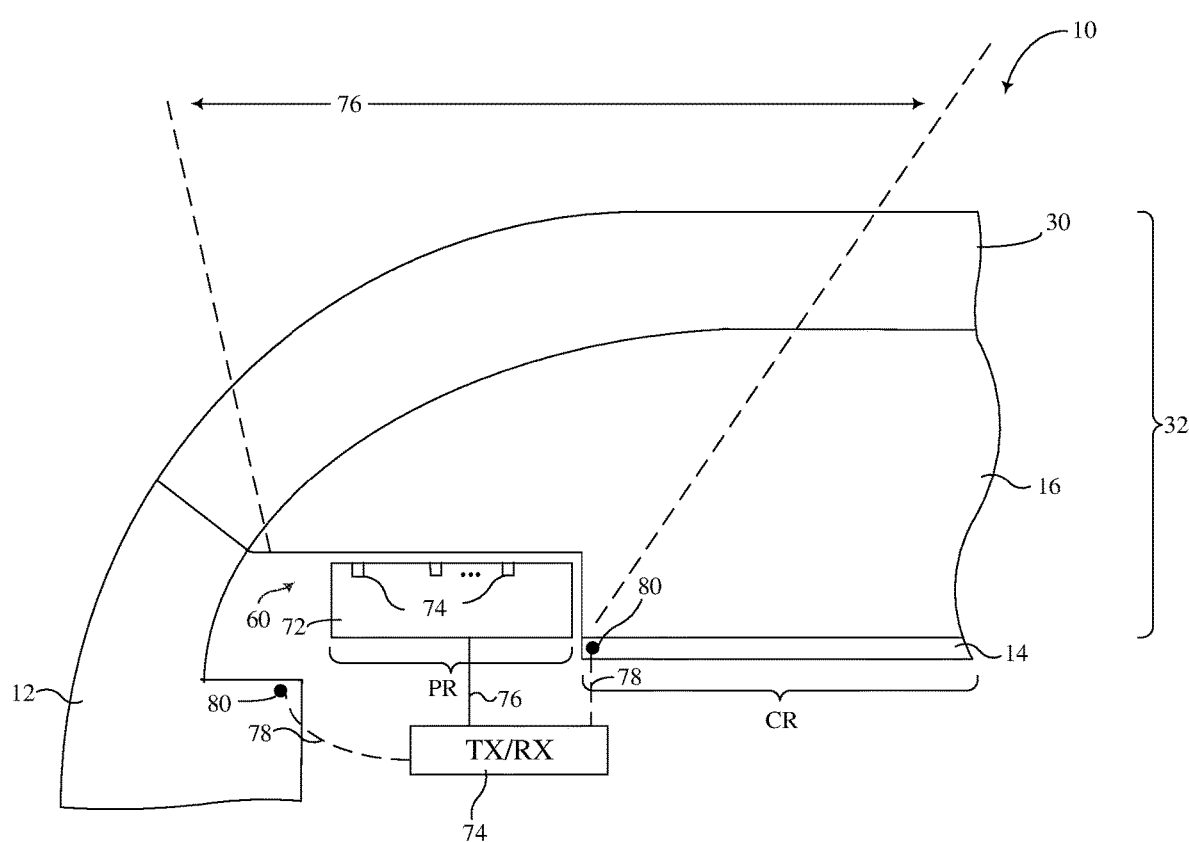
FIG. 7 is a cross-sectional side view of an illustrative electronic device such as a radio-frequency component that is overlapped by an image transport layer in accordance with an embodiment.

FIG. 7 shows how radio-frequency components such as illustrative radio-frequency component 72 may be overlapped by peripheral region PR of image transport layer 16. As shown in FIG. 7, radio-frequency components 72 may be located in an area that is not overlapped by the pixels of display 14 and the input surface of layer 16 such as in recess 60 (e.g., within a lateral indentation in the periphery of image transport layer 16).

Radio-frequency component 72 may be any suitable component that emits and/or receives radio-frequency signals (e.g., for radio-frequency sensing, for wireless communications, and/or for wireless power transfer). As an example, component 72 may be an antenna. In an illustrative configuration, the antenna may be a beam steering antenna with a phased array of antenna elements 74 (e.g., a beam steering millimeter wave antenna having multiple antenna elements 74 operated in a phased antenna array). Antenna elements 74 may be, for example, resonant cavity antenna elements operating at millimeter wave frequencies (e.g., 10-71 GHz, at least 10 GHz, less than 71 GHz, or other suitable frequencies) or may be a cellular telephone antenna, wireless local area network antenna, near-field communications antenna, wireless power antenna, etc. (e.g., an antenna operating at any suitable frequency from 30 Hz to 300 GHz, from 5-8 GH, from 100 MHz to 8 GHz, from 100 kHz to 1 MHz, from 1 MHz to 100 MHz, etc.).

An antenna such as component 72 may be coupled to wireless transceiver circuitry 74 via signal path 76 (e.g., a radio-frequency transmission line). In some configurations, display 14 and/or one or more layers adjacent to display 14 (e.g., a touch sensor layer, etc.) may include conductive material (e.g., metal traces, indium tin oxide and/or other transparent conductive material, etc.) that serves as part of an antenna. Housing 12 may also contain metal and/or other conductive housing material that serves as part of an antenna (e.g., an antenna ground plane). In arrangements in which housing 12 is conductive and display 14 (or an associated layer overlapping display 14) is conductive, an antenna may be formed from display 14 (or associated layers) and housing 12. For example, a slot antenna may be formed in the gap between antenna feed terminals 80 and may be electrically coupled to transceiver circuitry 74 by signal path 78 (e.g., a transmission line path). One of terminals 80 in this arrangement may be coupled to a conductive portion of housing 12 and the other of terminals 80 in this arrangement may be coupled to a conductive layer under layer 16 (e.g., a conductive layer in or adjacent to display 14). Other types of antenna may be located under peripheral portion PR of image transport layer 16, if desired (e.g., inverted-F antennas, patch antennas, loop antennas, dipoles, monopoles, Yagi antennas, slot antennas, coils, hybrid antennas based on two or more of these antennas, and/or other antennas).

By locating an antenna or other radio-frequency component 72 in recess 60 or other location overlapped by peripheral region PR of layer 16, the component may operate effectively, even when portions of housing 12 and/or display 14 are conductive. Because, for example, an antenna in region 60 is not overlapped by conductive material in display 14 and/or housing 12, this antenna will not be blocked by conductive material in device 10 and may operate effectively over a wide angular range (see, e.g., angular range 76 of FIG. 7).

Recess 60 may be formed in a ring shape surrounding all sides of central region CR or may have other suitable shapes. For example, recess 60 may be formed along only a single part of the peripheral edge of device 10, may be formed on opposing sides of device 10, etc.

Figure 8:
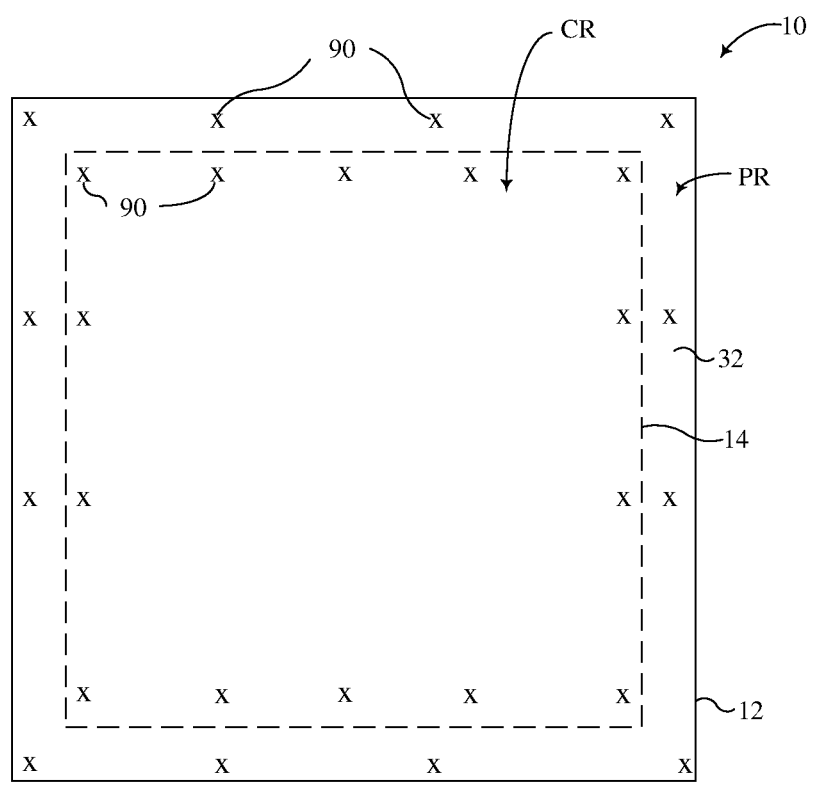
FIG. 8 is a top view of an illustrative electronic device with an image transport layer that overlaps electrical components in accordance with an embodiment.

FIG. 8 is a top view of device 10 showing illustrative locations 90 for electrical components (e.g., optical components 62 and/or 64 of FIG. 6 and/or an antenna or other radio-frequency component such as component 72). As shown in FIG. 8, locations 90 may include locations in peripheral region PR of image transport layer 16 (e.g., areas of device 10 that are not overlapped by display 14 and the input surface of layer 16 and that may contain recesses such as recess 60 to help accommodate the components). Locations 90 may also include locations that are located under display 14 and the input surface of layer 16 in central region CR (see, e.g., illustrative component 64 of FIG. 6, which is located under display 14 an the input surface of image transport layer 16 near the peripheral edge of display 14).

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
   a display configured to produce an image;
   an image transport layer configured to receive the image at an input surface located in a central region of the image transport layer and to transport the received image to an output surface, wherein the image transport layer has a peripheral recess in a peripheral portion of the image transport layer that runs along a peripheral edge of the central region; and
   an optical component that is in the peripheral recess and that is overlapped by the peripheral portion of the image transport layer.

2. The electronic device defined in claim 1 wherein the optical component comprises a light sensor.

3. The electronic device defined in claim 2 wherein the light sensor is configured to receive light that passes along a non-guiding light path through the image transport layer.

4. The electronic device defined in claim 3 wherein the light sensor comprises an ambient light sensor.

5. The electronic device defined in claim 3 wherein the light sensor comprises an infrared light sensor.

6. The electronic device defined in claim 3 wherein the light sensor forms a biometric sensor.

7. The electronic device defined in claim 3 wherein the light sensor forms a touch sensor.

8. The electronic device defined in claim 3 wherein the light sensor is configured to measure ultraviolet light.

9. The electronic device defined in claim 1 further comprising an additional optical component that is overlapped by the central region of the image transport layer and that receives light through the display.

10. The electronic device defined in claim 1 wherein the optical component comprises a light-emitting device that is configured to emit light that passes along a non-guiding light path through the image transport layer.

11. The electronic device defined in claim 1 wherein the optical component comprises a proximity sensor that is configured to emit light and detect light that passes along a non-guiding light path through the image transport layer.

12. The electronic device defined in claim 1 wherein the optical component comprises a status indicator that is configured to emit light that passes along a non-guiding light path through the image transport layer.

* * * * *